(12) United States Patent
Cadours et al.

(10) Patent No.: US 7,811,538 B2
(45) Date of Patent: Oct. 12, 2010

(54) MERCAPTAN REMOVAL METHOD

(75) Inventors: Renaud Cadours, Francheville (FR); Eric Lemaire, Anse (FR); Julia Magne-Drisch, Villette de Vienne (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 197 days.

(21) Appl. No.: 12/057,407

(22) Filed: Mar. 28, 2008

(65) Prior Publication Data

US 2008/0245703 A1    Oct. 9, 2008

(30) Foreign Application Priority Data

Mar. 30, 2007  (FR) .................................. 07 02403

(51) Int. Cl.
  *B01D 53/48* (2006.01)
(52) U.S. Cl. ................. 423/242.2; 423/242.1; 423/220; 423/245.1; 423/245.2; 208/208 R; 208/219; 208/222; 208/223; 208/224
(58) Field of Classification Search ............ 208/208 R; 423/242.2, 242.1, 220
  See application file for complete search history.

(56) References Cited

U.S. PATENT DOCUMENTS

| | | | |
|---|---|---|---|
| 4,775,462 A | 10/1988 | Imai et al. | |
| 2006/0034742 A1* | 2/2006 | Briot et al. ............... | 423/242.2 |

FOREIGN PATENT DOCUMENTS

| | | | |
|---|---|---|---|
| EP | 1 656 983 A1 | 5/2006 | |
| FR | 2 873 711 | 2/2006 | |

OTHER PUBLICATIONS

French Search Report, FR0702403, Nov. 13, 2007.

* cited by examiner

*Primary Examiner*—Glenn A Caldarola
*Assistant Examiner*—Michelle L Stein
(74) *Attorney, Agent, or Firm*—Antonelli, Terry, Stout & Kraus, LLP.

(57) ABSTRACT

The method allows to remove mercaptans contained in a gaseous feed comprising hydrocarbons by carrying out the following stages:
  a) contacting, in a reactor R1, gaseous feed 1 with a liquid stream 13 comprising olefins, in the presence of a first acid catalyst so that the mercaptans react with the olefins so as to form sulfides,
  b) discharging an effluent 3 from reactor R1 and separating the effluent into a gas phase and a liquid phase so as to obtain a mercaptan-depleted treated gas 4 and a sulfide-laden liquid,
  c) separating the sulfide-laden liquid into a first fraction 6 and a second fraction 5, the volume flow rate of first fraction 6 being at least three times higher than the volume flow rate of second fraction 5,
  d) recycling first fraction 6 to stage a) as a first portion of said liquid stream to be fed into said reactor R1,
  e) regenerating second fraction 5 by cracking so as to obtain a sulfide-depleted second fraction 2 that is recycled to stage a) as a second portion of said liquid stream.

9 Claims, 2 Drawing Sheets

MERCAPTAN REMOVAL METHOD

FIELD OF THE INVENTION

The present invention relates to the field of treating mercaptan-laden gaseous effluents, in particular natural gas.

BACKGROUND OF THE INVENTION

At the well outlet, natural gas is mainly made up of methane, ethane, propane and butane, and it also contains smaller amounts of heavier hydrocarbons. Natural gas furthermore contains various acid compounds, generally carbon dioxide ($CO_2$), hydrogen sulfide ($H_2S$), as well as carbonyl sulfide (COS) and mercaptans (RSH). The mercaptans mainly consist of methylmercaptan ($CH_3SH$), ethylmercaptan ($C_2H_5SH$), propylmercaptans ($C_3H_7SH$) and butylmercaptans ($C_4H_9SH$), and possibly mercaptans having longer hydrocarbon chains that can reach six carbon atoms.

The natural gas deacidizing operation, which is essentially intended to reduce the $CO_2$ and $H_2S$ content of the gas, is for example performed by means of an absorption method, using notably chemical solvents like, for example, alkanolamines such as diethanolamine (DEA) or methyldiethanolamine (MDEA). After this treatment, the gas meets the specifications relative to the $CO_2$ content, typically below 2% by mole, and to the $H_2S$ content, typically 4 ppm by mole. Part of the light mercaptans, notably methylmercaptan, is removed during this operation. The heavier mercaptans such as ethyl, propylmercaptans and butylmercaptans, or containing more than four carbon atoms, are not soluble enough in an aqueous solution or acid enough to significantly react with the alkanolamines generally used for deacidizing, and a large part thereof therefore remains in the gas. Most of these acid compound absorption methods have a mercaptan extraction efficiency ranging between 40% and 60%.

Document FR-2,873,711 discloses a method for collecting and removing the mercaptans contained in a natural gas by reaction with olefins.

The present invention is aimed to improve the method described in document FR-2,873,711.

SUMMARY OF THE INVENTION

In general terms, the present invention relates to a method for removing the mercaptans contained in a gaseous feed comprising hydrocarbons, wherein the following stages are carried out:

a) contacting, in a reactor, the gaseous feed with a liquid stream comprising olefins, in the presence of a first acid catalyst so that the mercaptans react with the olefins so as to form sulfides, b) discharging an effluent from the reactor and separating the effluent into a gas phase and a liquid phase so as to obtain a mercaptan-depleted treated gas and a sulfide-laden liquid, c) separating the sulfide-laden liquid into a first fraction and a second fraction, the volume flow rate of the first fraction being at least three times higher than the volume flow rate of the second fraction, d) recycling the first fraction to stage a) as a first portion of said liquid stream to be fed into said reactor, e) regenerating the second fraction by cracking so as to obtain a sulfide-depleted second fraction that is recycled to stage a) as a second portion of said liquid stream.

According to the invention, in stage e), said second fraction can be expanded so as to release co-absorbed hydrocarbons and to obtain an expanded liquid.

The expanded liquid can be heated to a temperature at least greater than 120° C. in order to crack the sulfides and to obtain the sulfide-depleted second fraction. The expanded liquid can be heated in the presence of a second acid catalyst.

A portion of the sulfide-depleted second fraction can be vaporized so as to obtain a liquid phase containing oligomers that are discharged.

The first and second acid catalyst can comprise at least one of the following compounds: phosphoric acid, sulfuric acid, boric acid, sulfonic acid, nitric acid, carboxylic acid, a faujasite, a mordenite, a zeolite, a resin, a fluorinated alumina, a chlorinated alumina, a natural clay, a synthetic clay.

The liquid stream can comprise olefins comprising at least three carbon atoms, the olefins being diluted in an inert phase consisting of alkanes comprising at least three carbon atoms.

The reactor can work at a pressure ranging between 10 bars and 200 bars, and at a temperature ranging between 0° C. and 200° C.

The gaseous feed can be a natural gas comprising mercaptans.

BRIEF DESCRIPTION OF THE FIGURES

Other features and advantages of the invention will be clear from reading the description hereafter, with reference to the accompanying figures wherein.

DETAILED DESCRIPTION

Figure 1:
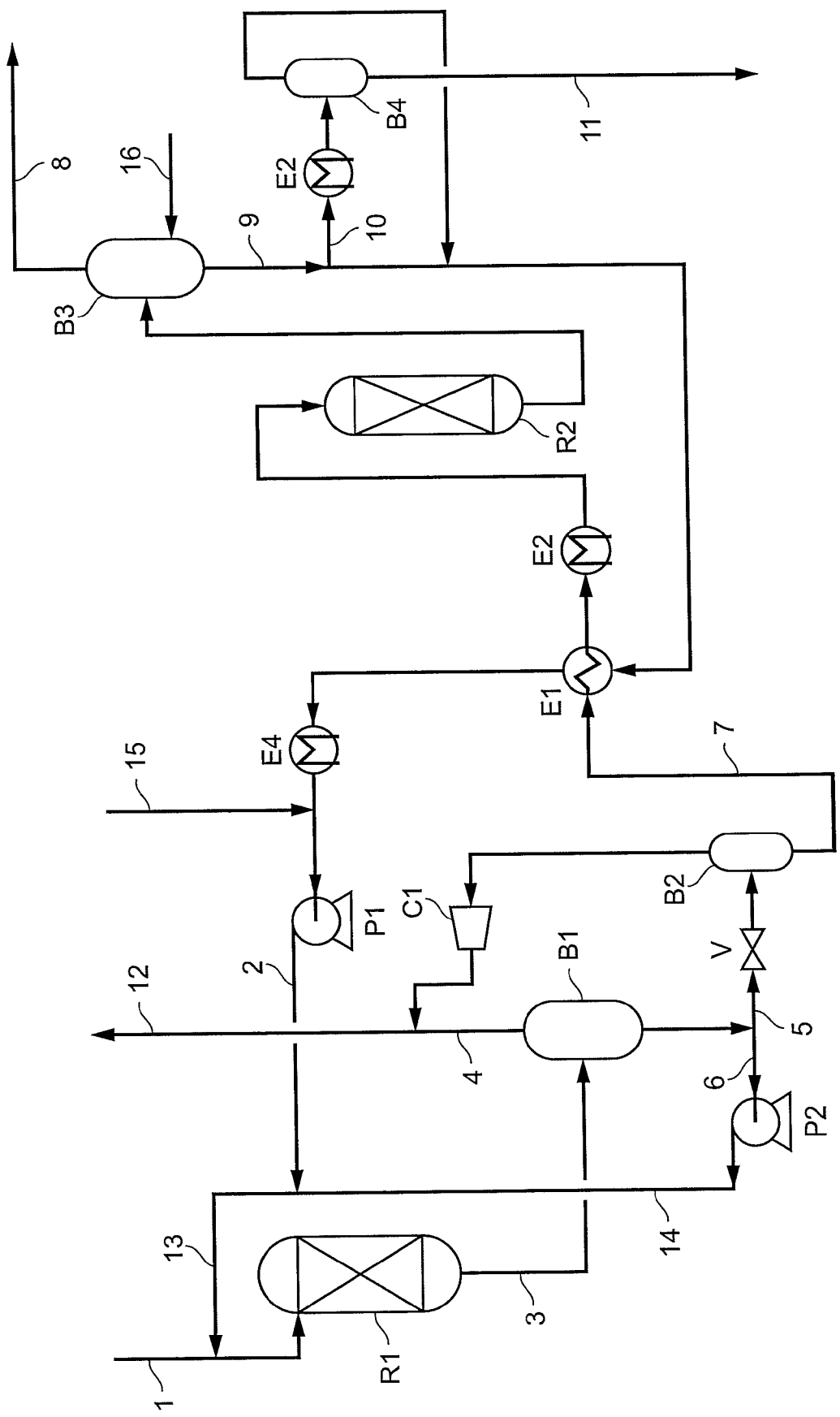
FIG. 1 diagrammatically shows the method according to the invention.

In connection with FIG. 1, the gaseous feed to be treated flows in through line 1. The feed can comprise hydrocarbons having between one and ten carbon atoms, preferably between one and five. For example, the feed can come directly from a drilling site, this feed is then commonly referred to as straight-run or natural gas. The feed can also come from a separation process, for example from a distillation column or a gas-liquid separator, or from a stage of regeneration of a sieve used for removing sulfur compounds from a natural gas feed, or from a conversion process, for example from a catalytic cracking unit or from a steam cracking unit.

The gaseous feed flowing in through line 1 is contacted with a liquid stream flowing in through line 13. The liquid stream comprises olefins. The mixture of gaseous feed and liquid stream is fed into reactor R1 containing an acid catalyst.

Alternatively to the embodiment shown in FIG. 1, the gaseous feed flowing in through line 1 and the liquid stream flowing in through line 13 can be fed directly into reactor R1 without being first mixed. In this case, lines 1 and 13 can be connected directly and separately to reactor R1.

In reactor R1, the gaseous mercaptans react with the liquid olefins in the presence of the acid catalyst so as to form a sulfide.

The chemical reaction conducted in R1 is:

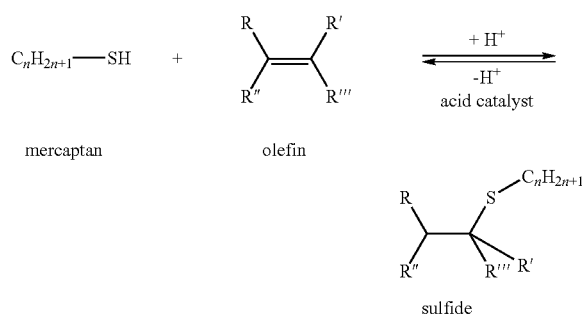

n being a value ranging between 0 and 8, preferably between 0 and 4

Each of the R, R', R" and R'" being made up of an H or of a $C_nH_{2n+1}$

This addition reaction is not modified by the alkyl chain length of the mercaptan or by the number of carbon atoms of the hydrocarbon chain of the olefin.

The sulfides formed are in the liquid phase, under suitable operating conditions. For example, according to the reaction described above, at atmospheric pressure, the methylmercaptan whose boiling point is 6.2° C. adds on to methyl-2-butene-2 (boiling point 38.6° C.) to form a sulfide whose boiling point ranges between 130° C. and 140° C.

According to the invention, a liquid stream comprising olefins diluted in an inert phase made up of alkanes is used.

The olefins contained in the liquid stream comprise at least three carbon atoms. In order to limit losses by entrainment in the gaseous effluent, the olefins preferably have between eight and fourteen carbon atoms. Preferably, the olefins are linear. These olefins preferably have a single double bond. However, branched olefins and/or diolefins can be used if need be.

The alkanes that make up the inert phase of the liquid stream comprise at least eight carbon atoms. Preferably, alkanes having a carbon chain of same length as the olefins that make up the liquid stream are used, in particular alkanes with 8 to 14 carbon atoms. Furthermore, it is possible to select alkanes whose standard boiling point does not differ by more than 30° C. from that of the olefins present in the liquid stream.

The acid catalyst allows to promote the addition reaction carried out in reactor R1. The acid catalyst can be phosphoric, sulfuric, boric, sulfonic, nitric acid. These acids can come in liquid form in the aqueous phase or in form of ionic liquids or of molten salts. These acids can be supported on solid supports made of silica, alumina or silica-alumina, or any other solid support. Acid catalysts such as resins, natural or synthetic zeolites can also be used to implement the present invention. By way of example, faujasites, mordenites, zeolites, X and Y for example, can be utilized. Other solid acids can be used, such as fluorinated or chlorinated aluminas, natural or synthetic clays. Any catalyst form can be used to implement the invention.

In reactor R1, gas-liquid contact can be achieved under the thermodynamic availability conditions of the gaseous effluent to be treated. For example, reactor R1 works at a pressure ranging between 10 and 100 bars, and at a temperature ranging between 0° C. and 200° C., preferably between 20° C. and 80° C.

Reactor R1 can be any type of device for contacting fluids. An excellent device is a co-current contacting column. Alternatively, a counter-current contacting column can also be used.

For example, descending or ascending co-current fixed-bed reactors can be used. These reactors contain the catalyst maintained in form of a bed between grids, the liquid and the gas flowing through the beds downwards or upwards. The catalyst is not in motion, the volume between the grids corresponding to the volume occupied by the catalyst at rest.

An ebullating bed or an expanded bed type reactor can also be used. These reactors contain the catalyst between grids, the volume between the grids being larger than the volume occupied by the catalyst at rest. During circulation of the liquid and of the gas, the catalyst can thus expand so as to work as an expanded bed, or it can even set off to work as an ebullating bed. This type of reactor is well suited for implementation of the invention because it uses liquid recycling around the reactor so as to increase the flow rate of liquid in the reactor.

The ratio of the volume flow rate of feed flowing in through line 1 to the volume of catalyst can range between 0.1 $m^3/m^3/h$ and 3 $m^3/m^3/h$.

In connection with FIG. 1, the mixture of gas to be treated and of liquid stream circulates in a co-current flow in the fixed bed of reactor R1.

The gas/liquid mixture discharged from reactor R1 through line 3 is fed into separating drum B1. The treated gas is discharged at the top of drum B1 through line 4. The liquid phase separated from the treated gas is discharged at the bottom of drum B1.

According to the invention, the liquid phase from drum B1 is separated into two fractions: a fraction circulating in line 6 and the remaining fraction circulating in line 5. The fraction circulating in line 6 is directly recycled by means of pump P2 and of lines 14 and 13 upstream from reactor R1. On the other hand, the fraction circulating in line 5 is sent to regeneration stages. The fraction that is directly recycled to reactor R1 is larger than the fraction sent to the regeneration stages. For example, the flow rate of the liquid circulating in line 6 is at least three times higher than the flow rate of the fraction sent through line 5 to regeneration. Recycling liquid around reactor R1 and sending a small part of the liquid to the regeneration stage allows to limit hydrocarbon losses, liquid alkane and olefin losses, the power of the rotating machines and of the exchangers. Furthermore, recycling around reactor R1 allows to increase the flow rate of liquid in the reactor so as to improve contact between the gas and the liquid in order to promote the addition reactions between olefins and mercaptans.

The liquid circulating in line 5 undergoes expansion in valve V. The co-absorbed hydrocarbons are separated from the rest of the liquid phase in separating drum B2. The gaseous hydrocarbons discharged at the top of drum B2 can be compressed by compressor C1 and mixed with the treated gas circulating in line 4 in order to limit gas losses. The gas mixture is discharged through line 12. The loss of hydrocarbons co-absorbed in the liquid phase is all the more limited as the flow rate of the liquid circulating in line 5 to regeneration is reduced.

The hydrocarbon-depleted liquid phase is sent through line 7 to heat exchangers E1 and E2 in order to be heated. The hot liquid is then fed into catalytic reactor R2 to be regenerated. In R2, the liquid comprising the sulfides formed by reaction between the mercaptans and the olefins is contacted with an acid catalyst at high temperature, for example a temperature ranging between 90° C. and 150° C. In R2, the sulfides are decomposed by cracking reaction into mercaptans and olefins.

Reactor R2 can be of the same type as reactor R1 described above. Furthermore, the catalyst contained in reactor R2 can be selected from a group of products identical to the group mentioned above in the description of the catalyst of reactor R1.

The cracking operation generates two fractions that are separated in drum B3:
- a gaseous fraction containing the mercaptans initially present in the natural gas. These mercaptans discharged through line 8 can be burnt with part of the gas in the site furnaces and converted to sulfur oxides, or treated in a Claus plant,
- a liquid fraction consisting of the alkane phase and the regenerated olefin.

In order to improve separation of the gas and of the liquid in drum B3, a stream of inert gas, nitrogen for example, can be fed through line 16 so as to promote discharge of the mercaptans in the gas phase.

Alternatively, regeneration can be carried out only by raising the temperature in E2, without contacting with a catalyst, for example in the case of the use of branched olefins in the method according to the invention. In the absence of catalyst, the liquid is heated in E2 to a high temperature, preferably above 120° C. This temperature can vary depending on the olefin used and on the sulfide formed in R1. In this case, reactor R2 is not used, the hot effluent from E2 is directly fed into separating drum B3.

The liquid fraction obtained at the bottom of drum B3 is sent through line 9 to heat exchanger E1 to be cooled by indirect heat exchange with the liquid circulating in line 7. Then, the liquid fraction is cooled in heat exchanger E4 and pumped by pump P1. If necessary, make-up product (olefins and/or alkanes) can be added through line 15 to the liquid fraction from E4. The liquid fraction obtained at the outlet of P1 through line 2 is mixed with the liquid flowing in through line 14.

This collection of liquids is sent through line 13 into line 1 to be mixed with the gaseous feed to be treated, this mixture of gas and liquid being fed into R1. Alternatively, according to an embodiment that is not shown in FIG. 1, the mixture of liquids is fed through line 13 directly into reactor R1, the gaseous feed to be treated being fed separately into R1 through line 1.

Furthermore, according to the invention, a stage commonly referred to as reclaiming can be carried out to limit the accumulation of oligomer products from the side reactions that occur in the liquid phase. A portion of the liquid fraction obtained at the bottom of drum B3 can be withdrawn through line 10. This portion is heated to high temperature in exchanger E3, above 200° C. for example, to vaporize the liquid phase comprising the alkanes and the olefins and to obtain a liquid containing oligomers from side reactions. The vaporized phase is separated from the non-vaporized liquid in drum B4. The liquid is discharged through line 11, the vaporized phase is mixed with the solvent from the bottom of drum B3, downstream from the point of withdrawal through line 10. Alternatively, the reclaiming operation carried out in exchanger E3 and drum B4 can be performed in a column provided with a condenser and a reboiler.

Figure 2:
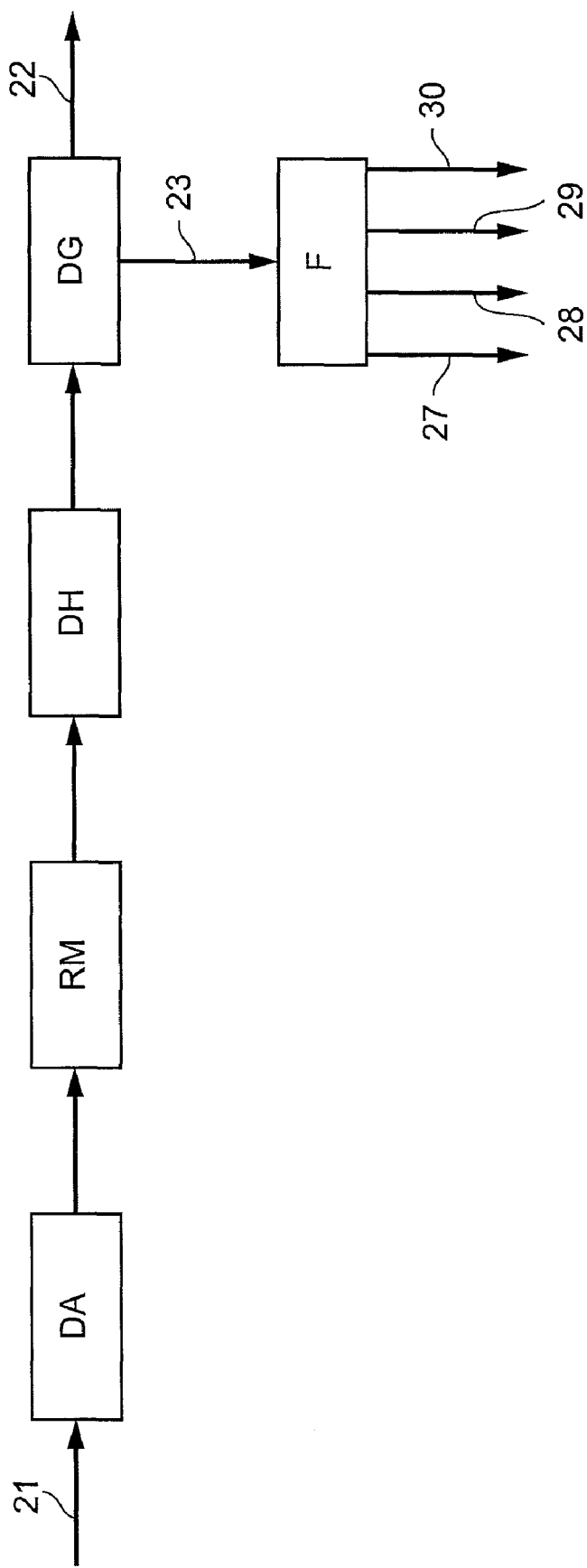
FIG. 2 diagrammatically shows a natural gas treating process comprising the method according to the invention.

The mercaptan collection method according to the invention can be used in a natural gas treatment chain. In FIG. 2, the raw natural gas flows in through line 21 in order to be fed into deacidizing plant DA. The deacidized natural gas is subjected in plant RM to the mercaptan collection process as described in connection with FIG. 1. The natural gas from plant RM is then dehydrated in plant DH, then subjected to gasoline extraction in plant DG. The methane cut and possibly the ethane cut is discharged through line 22. The hydrocarbons heavier than methane are discharged from plant DG through line 23 to be fractionated in plant F into various valorizable hydrocarbon cuts, for example a propane cut 27, a butane cut 28 and a cut comprising the pentanes 29 and the heavier hydrocarbons 30.

Alternatively, mercaptan removal plant RM can be arranged downstream from dehydration plant DH. The method according to the invention can be applied to the gas obtained at the outlet of plant DH. Alternatively, the method according to the invention can be applied to gaseous fractions obtained after gasoline extraction plant DG or fractionation plant F. For example, the methane cut discharged through line 22 is treated in a plant RM. It is also possible to treat the propane cut discharged through line 27 or the butane cut discharged through line 28 in a plant RM insofar as these cuts are in the gas phase.

The method according to the invention described in connection with FIG. 1 is illustrated by the numerical example hereafter.

A natural gas whose composition is given below, which has first undergone deacidizing, is mixed with a liquid phase consisting of an olefin and of an inert alkane phase. The olefin used is dodecene, a linear olefin with 12 carbon atoms. The alkane phase used is dodecane, a linear alkane with 12 carbon atoms. The liquid phase contacted with the gas comprises 2.6 wt. % olefins.

The gas-liquid mixture is fed into a reactor R1 comprising an acid catalyst of resin type in a fixed bed. The reaction conditions are 45° C. and 70 bars.

Composition of the Natural Gas (Proportion by Weight):
nitrogen: 5.42%
methane: 74.25%
ethane: 9.07%
propane: 4.79%
butane: 3.30%
pentane: 1.53%
hexane: 0.57%
heptane: 0.87%
$CO_2$: 0.01%
$H_2O$: 0.13%
$H_2S$: 8 ppm
$CH_4S$: 88 ppm
EtSH: 439 ppm
PrSH: 63 ppm
BuSH: 5 ppm i.e. in total 595 ppm weight mercaptans in the gas to be treated.

At the outlet of reactor R1, the residual mercaptan content is 3 ppm weight, i.e. 99.5% mercaptan conversion.

The gas-liquid mixture from reactor R1 is fed into separating drum B1. The liquid phase discharged from drum B1 is separated into two fractions: a fraction representing 92 wt. % of the liquid from R1 and the remaining fraction representing 8 wt. %. The fraction comprising 92 wt. % of the liquid from B1 is recycled upstream from reactor R1 through lines 6 and 14 in order to minimize losses and to maximize the liquid feed at the reactor inlet, and therefore to favour gas-liquid contact.

The remaining liquid fraction (8 wt. %) is sent to separating drum B2 that allows, through expansion to 5 bars, to recover 71% of the co-absorbed hydrocarbons and thus to limit valorizable gaseous feed losses.

The liquid fraction from B2 is sent to a regenerator R2 comprising a resin type acid catalyst. The regeneration conditions are 110° C. and 1 bar. These conditions allow to decompose the sulfides formed by addition of the mercaptans to the dodecene and thus to regenerate the dodecene and to separate the mercaptans in form of a gaseous fraction. The regeneration ratio for the sulfides formed is 95%.

A secondary dodecene oligomerization reaction leads to the formation of hydrocarbons with 24 carbon atoms. These oligomers are purged after gas-liquid separation in separating drums B3 and B4, and the losses correspond to 0.2% of the regenerated liquid.

The method according to the invention has allowed to remove 99.5% of the mercaptans from the gas to be treated, with a liquid feed loss of 0.2% in relation to the regenerated fraction and a loss in hydrocarbons removed with the mercaptans of 0.5% in relation to the amount fed into reactor R1.

The invention claimed is:

1. A method for removing the mercaptans contained in a gaseous feed comprising hydrocarbons, wherein the following stages are carried out:
   a) contacting, in a reactor, the gaseous feed with a liquid stream comprising olefins, in the presence of a first acid catalyst so that the mercaptans react with the olefins so as to form sulfides,
   b) discharging an effluent from the reactor and separating the effluent into a gas phase and a liquid phase so as to obtain a mercaptan-depleted treated gas and a sulfide-laden liquid,
   c) dividing the sulfide-laden liquid into a first fraction of the sulfide-laden liquid and a second fraction of the sulfide-laden liquid, the volume flow rate of the first fraction being at least three times higher than the volume flow rate of the second fraction,
   d) recycling the first fraction to stage a) as a first portion of said liquid stream to be fed into said reactor,
   e) regenerating the second fraction by cracking so as to obtain a sulfide-depleted second fraction that is recycled to stage a) as a second portion of said liquid stream.

2. A method as claimed in claim 1 wherein, in stage e), said second fraction is expanded so as to release the co-absorbed hydrocarbons and to obtain an expanded liquid.

3. A method as claimed in claim 2, wherein the expanded liquid is heated to a temperature at least greater than 120° C. in order to crack the sulfides and to obtain the sulfide-depleted second fraction.

4. A method as claimed in claim 3, wherein the expanded liquid is heated in the presence of a second acid catalyst.

5. A method as claimed in claim 4, wherein a portion of the sulfide-depleted second fraction is vaporized in order to obtain a liquid phase containing oligomers that are discharged.

6. A method as claimed in claim 1, wherein the first and second acid catalyst comprise at least one of the following compounds: phosphoric acid, sulfuric acid, boric acid, sulfonic acid, nitric acid, carboxylic acid, a faujasite, a mordenite, a zeolite, a resin, a fluorinated alumina, a chlorinated alumina, a natural clay, a synthetic clay.

7. A method as claimed in claim 1, wherein the liquid stream comprises olefins comprising at least three carbon atoms, the olefins being diluted in an inert phase consisting of alkanes comprising at least three carbon atoms.

8. A method as claimed in claim 1, wherein the reactor works at a pressure ranging between 10 bars and 200 bars, and at a temperature ranging between 0° C. and 200° C.

9. A method as claimed in claim 1, wherein the gaseous feed is a natural gas comprising mercaptans.

* * * * *